April 28, 1936.     M. H. HANSEN     2,039,164
SCALE
Filed Aug. 18, 1932
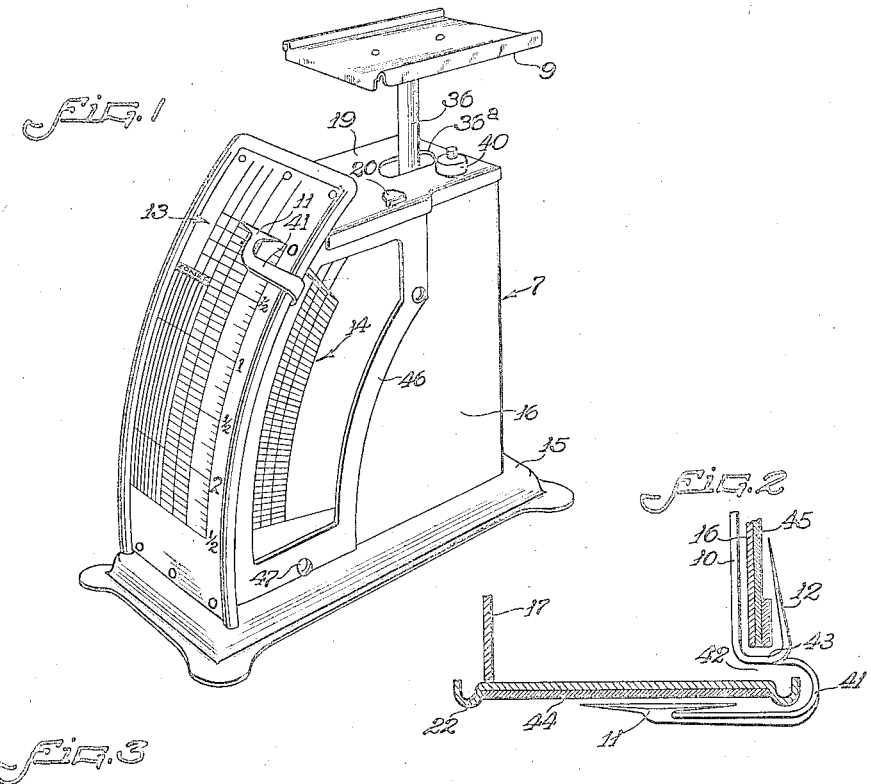
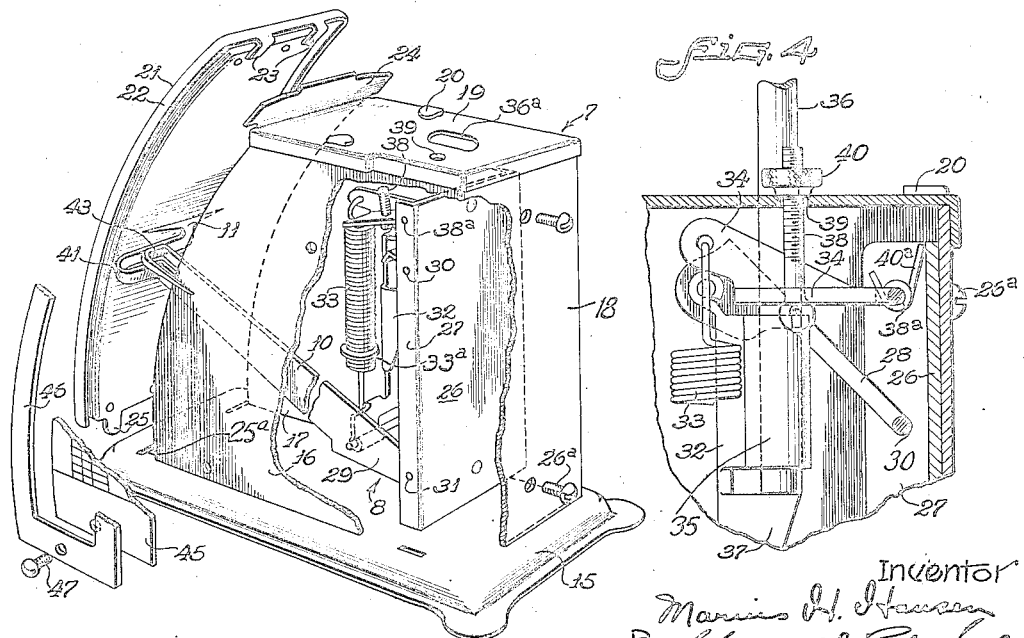

Patented Apr. 28, 1936

2,039,164

UNITED STATES PATENT OFFICE 2,039,164

SCALE

Marius H. Hansen, Chicago, Ill., assignor to Hanson Scale Company, Chicago, Ill., a corporation of Illinois Application August 18, 1932, Serial No. 629,258

3 Claims. (Cl. 265—68)

The invention pertains to a small portable scale especially suitable for weighing light articles, and has for its general aim an economical and practical construction having a wide range of utility.

With the foregoing aim in view, one object of the invention is to simplify the construction and reduce the cost of manufacture of such scales through the provision of a weighing mechanism constructed as a unit for convenient mounting within an enclosing casing.

Another object is to provide a scale having an improved dial and indicator arrangement.

A further object is to provide improved means for adjusting the initial position of the indicator arm.

The objects of the invention thus set forth, together with other and ancillary advantages, are obtained by the construction illustrated by way of example in the accompanying drawing forming part hereof, in which:

Figure 1 is a perspective view of a scale embodying my invention.

Fig. 2 is a transverse sectional view through the forward portion of the scale and illustrating the dial and indicator arrangement.

Fig. 3 is a fragmentary perspective view illustrating the method of assembling the parts of the scale, the unitary weighing mechanism being shown in a position occupied after insertion into the scale casing just before attachment thereto.

Fig. 4 is a fragmentary vertical sectional view especially illustrating the means for adjusting the tension of the spring of the weighing mechanism.

The improved scale comprises as herein shown a casing 7 having a weighing mechanism generally designated 8 constructed and separately assembled as a unit and then mounted conveniently within the casing 7. The weighing mechanism carries the usual scale pan 9 and includes an indicator arm 10 provided at its free end with one or more pointers, herein two in number, which are designated 11 and 12. On the casing are suitable dials 13 and 14 with which the points 11 and 12 coact.

The casing 7 comprises in the present instance a base 15 preferably formed from a single sheet of metal, side walls 16 and 17, and a rear wall 18. The side and rear walls are formed from one sheet of metal bent into U-form and having their lower edges suitably secured to the base 15. A top wall 19 in the form of a flat plate has downturned edge flanges fitting over the upper edge portions of the side and rear walls, and said top wall is suitably secured in position as by means of lugs 20. A curved plate 21 forms the front wall of the casing. This plate has beaded edges terminating in side and top flanges 22, and at the upper edge of the top flange are formed hooked lugs 23 adapted to engage the upper edge of a flange 24 projecting upwardly and rearwardly from the forward edge of the top wall 19. The lower end of the front wall 21 is suitably secured in position as by means of lugs 25 extending into slots 25ª in the base 15.

The unitary weighing mechanism comprises an upright base plate 26 adapted to be mounted on the rear wall of the casing as by means of screws 26ª inserted through tapped holes in the base plate. This plate has side flanges 27 to which arms 28 and 29 are pivoted at 30 and 31 respectively near the upper and lower ends of the base plate. The free ends of said arms are pivotally connected by a link 32, and the usual tension spring 33 is anchored at its lower end to the arm 29 and at its upper end to an adjustable bracket 34 carried by the base plate 26. The link 32 is formed near its upper end with a sleeve 35 to receive a stem 36 carrying the scale pan 9. This stem extends through a slot 36ª in the top wall 19, and its lower end rests upon a stop lug 37 (Fig. 4) also formed on the link 32 beneath the sleeve 35.

The indicator arm 10 is formed as an extension of the lower arm 29 at one side thereof, and the lower arm, together with the upper arm 28, forms with the link 32 and the base plate 26 a parallel motion linkage which is acted upon by the spring 33 to support the scale pan in its normal elevated position, with the indicator arm in its elevated position. At its lower end the spring is anchored to the indicator arm by the usual washer 33ª interposed between adjacent convolutions of the spring at a point such that the effective length of the spring will conform to the given load. Adjustment of the initial position of the indicator arm is effected by means of a screw 38 anchored at its lower end to the bracket 34 which latter is pivoted at 38ª to the upper end of the base plate 26. The upper end of the screw extends through an opening 39 in the top plate 19 and is equipped with an adjusting nut 40 which bears against the top plate in raising and lowering the screw. A coil spring 40ª is provided about the pivot for the bracket 34 so as to exert a downward force on the bracket which is restrained by the screw 37 and nut 40.

By the use of an adjusting bracket as thus set forth, torsional strains imparted to the screw by the rotation of the nut are resisted by the bracket and hence cannot be transmitted to the spring 33 as in prior constructions, thus avoiding any tendency to rotate the spring relative to the washer 33ª and thereby change the effective length of the spring. Moreover, the downward thrust on the lever 34 exerted by the springs 33 and 40ª is transmitted to the nut 40, thus increasing the frictional engagement between the nut and the top plate 19 with the result that the nut will be restrained from accidental turning. This avoids the necessity for frequent adjustment of the indicator arm.

An important feature of my invention resides in the indicator and dial arrangement employed. Thus, the pointer 11 is mounted on the end of the indicator arm 10 in a manner such as to avoid the usual elongated slot in the front plate and dial 13, and thereby render available the entire area of the dial for the reception of graduations, numerals or other data. In attaining this result, the pointer is mounted on the outer or free end of a U-shaped member or yoke 41, the opposite end of which is formed integral with the arm 10. As shown clearly in Fig. 2, this yoke 41 straddles one edge of the front plate 21 with its free end overlying the dial 13 and its inner end portion extending through an arcuate slot 42 formed by terminating the forward edge of the side wall 16 short of the front wall. This construction further renders possible the use of a second pointer 12 which is likewise formed integral with the arm 10 being bent outwardly from the arm to form a yoke 43 straddling the forward edge portion of the side wall 16. The pointer thus extends rearwardly along the side wall 16 in proper cooperative relation to the dial 14.

As shown, the scale is intended for use as a postal scale and the dials 13 and 14 are correspondingly designed. In each instance, the graduations and other data are printed upon sheets of celluloid or the like which are secured in position in proper relation to the pointers 11 and 12. Thus, the dial 13 is made from a sheet 44 (Fig. 2) of celluloid and riveted at its upper and lower edges to the front plate 21; and the dial 14 is made from a sheet 45 which is held in position by means of a frame 46 fastened with screws 47 to the side wall 16.

It will be observed that the weighing mechanism 8, including the indicator arm 10 and its pointers 11 and 12, may be completely constructed and assembled as a unit and then mounted in the casing by means of the two fastening screws 26ª, the casing having been previously assembled complete except for the attachment of the front wall 21. With the weighing unit thus secured in position and the adjusting screw 38 inserted through the hole 39 in the top wall thereof, the front wall plate 21 may be quickly and easily secured in position, the adjusting nut 40 applied and the scale pan set in position with its supporting stem inserted in its sleeve or socket 35.

It will also be apparent that the indicator and dial arrangement employed increases the range of usefulness of the scale by rendering it possible to use two pointers, and by the elimination of any slot in the front dial so as to increase the space available for scale data. Also, the absence of a slot in the front dial improves the appearance of the scale in that it eliminates an objectionable tendency on the part of the dial sheet to turn up or curl at the edges of such a slot.

I claim as my invention:

1. A scale having, in combination, a casing including a curved upwardly and rearwardly inclined front plate and a side plate, and a weighing mechanism having an indicator arm, a pointer, and a yoke on the end of said arm and carrying said pointer, said side plate providing a slot at the rear side of the front plate to receive said yoke.

2. A scale having, in combination, a casing including a curved upwardly and rearwardly inclined front plate and a side plate, and a weighing mechanism having an indicator arm with two pointers one extending rearwardly along the forward edge of the side plate and the other extending transversely of the front plate, and two dials carried respectively by the front plate and the side plate in cooperative relation with said pointers.

3. A scale comprising, in combination, a casing having a curved upwardly and rearwardly inclined front plate and a side plate, and a weighing mechanism including an indicator arm having at its free end a yoke straddling one edge of the front plate, a pointer carried by the free end of said yoke and overlying the front plate, and a second pointer carried by said arm and extending rearwardly along the forward edge of the side plate, each of said plates having a dial thereon for cooperation with said pointers.

MARIUS H. HANSEN.